Patented Jan. 10, 1950

2,494,254

UNITED STATES PATENT OFFICE 2,494,254

SUBSTITUTED HYDROFLUORENE CARBOXYLIC ACIDS

Karl Miescher, Riehen, and Georg Anner, Basel, Switzerland, assignors to Ciba Pharmaceutical Products, Inc., Summit, N. J.

No Drawing. Application September 11, 1947, Serial No. 773,494. In Switzerland December 20, 1946

4 Claims. (Cl. 260—469)

This invention relates to the manufacture of hydrofluorene-2-carboxylic acids, which contain in the 7-position a phenolic hydroxyl group and in each of the 1- and 2-positions a hydrocarbon radical, for example, 7-hydroxy-1:2-dialkyl-tetrahydrofluorene-2-carboxylic acids or 7-hydroxy-1:2-dialkyl-hexahydrofluorene-2-carboxylic acids, and derivatives of such acids, especially esters and ethers thereof. The compounds of this new group unexpectedly exhibit an extraordinarily high estrogenic activity in rats when administered parenterally or orally. Thus, for example, the threshold value for 7-methoxy-2-methyl-1-ethyl-1:2:4-tetrahydrofluorene-2-carboxylic acid is 1–2γ, when administered in bicarbonate solution to castrated female rats in a single dose either subcutaneously or by the stomach. In the same animals 1 milligram, whether administered subcutaneously or by the stomach, produces an estrus lasting about 10 days.

The high estrongenic activity of certain hydrophenanthrene-2-carboxylic acids and derivatives thereof is known (compare Miescher and co-workers, Helvetica Chemica Acta, vol. 27, page 1727 [1944]; loc. cit. vol. 28, pages 156, 1342, and 1506 [1945]; loc. cit. vol. 29, pages 586, 1071, 1231, 1889 and 1895 [1946]; Experientia, vol. 2, page 409 [1946]. However, this activity appears to be connected with the intact phenanthrene structure, and is completely lost when the 6-membered ring carrying the carboxyl group is contracted to a 5-membered ring (compare, Billeter and Miescher, Helvetica Chimica Acta, vol. 29, page 859 [1946]).

The new hydrofluorene-2-carboxylic acids and their derivatives are made by reacting a 1-keto-hydrofluorene, which contains in the 2-position a functionally converted carboxyl group in addition to a hydrocarbon radical and in the 7-position a free phenolic hydroxyl group or a substituent convertible into such a group, with an organic-metallic compound appropriate for introducing a hydrocarbon radical into the 1-position, eliminating the newly formed tertiary hydroxyl group directly or indirectly, and, if desired, converting the functionally converted carboxyl group in the 2-position into a free carboxyl group and/or converting the substituent in the 7-position into a free hydroxyl group, and hydrogenating any non-aromatic carbon-to-carbon multiple bond at any desired stage after reaction with the organo-metallic compound.

As starting materials there may be used, those, for example, derived from 1:2:3:4-tetrahydrofluorenes or 1:2:3:4:10:11-hexahydrofluorenes, which contain in the 1-position a keto-group; in the 2-position a hydrocarbon radical, for example, an alkyl radical, such as a methyl, ethyl or propyl radical, or an alkenyl radical, for example, an allyl radical or an aralkyl, for example, a benzyl radical, and also a functionally converted carboxyl group, for example, a nitrile or acid amide group, especially an esterified carboxyl group, for example, a carbomethoxy, carbethoxy or carbobenzyloxy group; and in the 7-position a free phenolic hydroxyl group or a substituent convertible into such a group, for example, by hydrolysis. The latter substituent may, for example, be a hydroxyl group etherified with methanol, ethanol, a phenol, a benzyl alcohol or the like, or esterified with an organic or inorganic acid, such as acetic, propionic, benzoic, phosphoric or sulfuric acid, or it may be an amino group. The starting material may have any desired steric configuration, and may contain further substituents.

In order to introduce into the 1-position a hydrocarbon radical, for example, an alkyl radical such as methyl, ethyl or propyl, an alkenyl radical such as allyl, an aralkyl radical such as benzyl, or an alkinyl radical such as ethinyl, the starting material is first reacted with the appropriate organo-metallic compound, for example, with an organo-magnesium halide or an organo-zinc halide, an alkyl-alkali such as sodium ethyl or alkinyl-alkali compound such as sodium or potassium acetylide. From the resulting tertiary alcohol, if desired, after hydrogenating any side chain multiple bonds, the newly formed tertiary hydroxyl group is eliminated directly or indirectly. This may be brought about, for example, with the formation of a carbon-to-carbon double bond. For this purpose, for example, water is split off directly or the hydroxyl group is first exchanged for halogen or another ester residue or an ether residue. Then the hydroxyl group so converted may be eliminated, for example by the action of heat or by treatment with an agent capable of splitting off an acid or an alcohol. The splitting off of the tertiary hydroxyl group, which results from the above described reaction with the organometallic compound may also be brought about by the further action of an excess of the organo-metallic compound at a raised temperature. Finally, the elimination of the hydroxyl group or of the halogen atom may alternatively be brought about by reduction, for example, by means of hydrogen in the presence of glacial acetic acid and a precious metal cetalyst. The conversion of the functionally converted carboxyl group in the 2-position into a free carboxyl group and/or of the esterified or etherified hydroxyl group in the 7-position into a free hydroxyl group is brought about by hydrolysis. In the case of benzyl ether groups, there may also be used, for example, a reducing agent. An amino group in the 7-position is converted into a hydroxyl group by diazotisation followed by boiling. When the aforesaid substituents in the 2- and 7-positions are both to be converted into a free carboxyl group and a free hydroxyl group, respectively, this may also be carried out in stages in either order of succession.

In order to saturate non-aromatic carbon-to-carbon multiple bonds, especially double or triple bonds introduced by splitting off the tertiary hydroxyl group or by reaction with an unsaturated organo-metallic compound, hydrogenation, if desired, may be carried out at any stage after the reaction with the organo-metallic compound. For this purpose there may be used, for example, chemical methods such as catalytic or electrolytic hydrogenation or treatment with nascent hydrogen, or biochemical methods. A multiple bond of an unsaturated radical which has been introduced, and a double bond resulting from the splitting off of the tertiary hydroxyl group, may also be hydrogenated in two different reaction stages. More especially, a multiple bond introduced with an unsaturated radical may first be saturated with hydrogen, and then the tertiary hydroxyl group split off with the formation of a double bond, which is subsequently hydrogenated.

The resulting compounds containing free carboxyl groups may be esterified, for example, directly with diazomethane or diazo-ethane or indirectly by way of the acid chloride or an alkali salt of the carboxylic acid in question. Finally, free phenolic hydroxyl groups may be esterified or etherified in known manner. In this connection there may be mentioned the esters with organic acids, especially with aliphatic and aromatic acids, for example, acetic acid, propionic acid, butyric acid, palmitic acid, stearic acid or benzoic acid, or with sulphonic acids, polycarboxylic acids or carboxy-sulphonic acids, or finally with inorganic acids, such as sulphuric acid and phosphoric acid, or carbonic acid and derivatives thereof. Among the ethers there may be specially mentioned, for example, the alkyl ethers, such as the methyl, ethyl or propyl ethers, and the glucosides.

The free carboxylic acids may be converted into carboxylic acid salts, for example, alkali metal, alkaline earth metal or ammonium salts. When the ester or ether residues in the 7-position contain basic groups, the corresponding salts with inorganic acids or the betaine ester salts, for example, may be made. The said salts may be used in aqueous solution, or for inoculation therapy.

The products of the invention find application as medicaments or as intermediate products.

The starting materials used in the process of the invention are new. In order to prepare them there may advantageously be used, for example, the following method of synthesis which is elucidated by the Formulae I to XII.

Reaction of the sodium salt of the malonic acid ester I with glutaric acid ester chloride yields the compound II, and then the triester III is obtained by ring closure, for example, with concentrated phosphoric acid or sulphuric acid. The dicarboxylic acid V, obtained by decarboxylation of the tricarboxylic acid IV (during which transposition of the ethylenic double bond occurs), is converted into the diester VI, which is then caused to undergo ring closure by the Dieckmann method to form the keto-ester VII. The desired 1:2:3:4-tetrahydrofluorene-1-one is obtained from VII, for example, by alkylation. By starting from the dicarboxylic acid IX and carrying out the last stages of the synthesis, there is obtained as the final product 1:2:3:4:10:11-hexahydrofluorene-1-one of Formula XII.

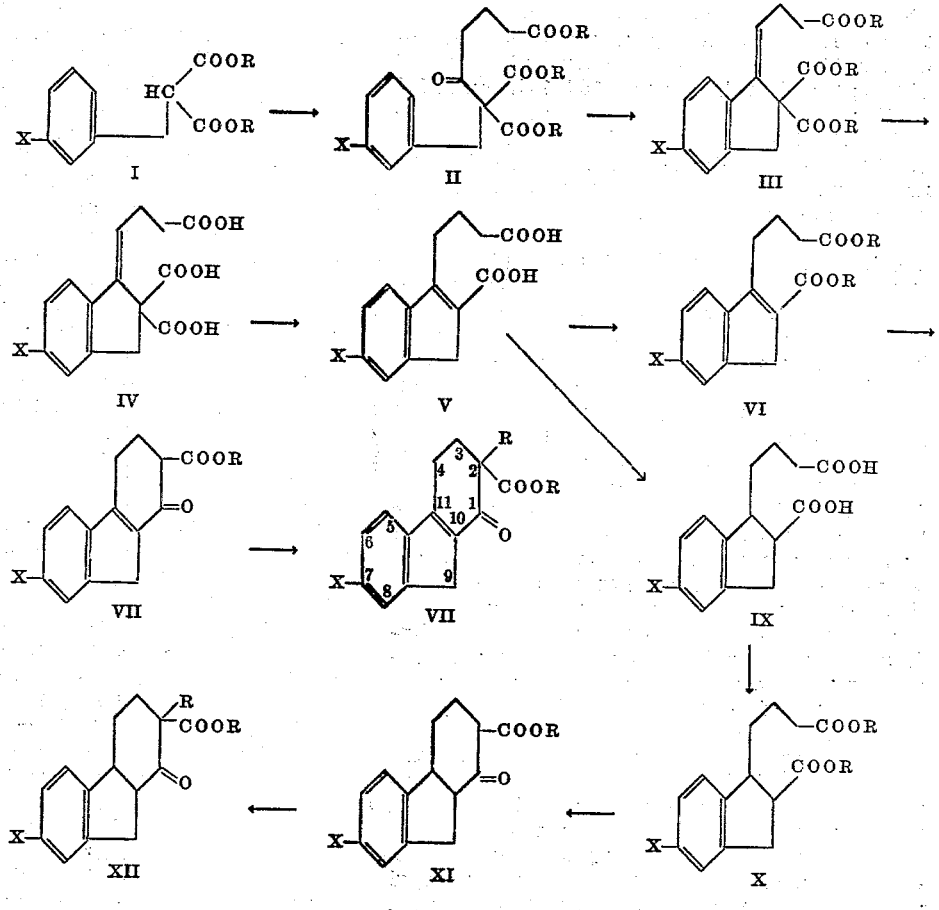

Suitable starting materials can also be obtained, for example, in the following (see Formulae XIII to XVI):

The hydroxymethylene compound XIV obtained from 1:2:3:4-tetrahydrofluorene-1-one of Formula XIII is reacted with hydroxylamine and upon splitting off water the compound XV is obtained. Alkylation of the latter compound yields the keto-nitrile XVI.

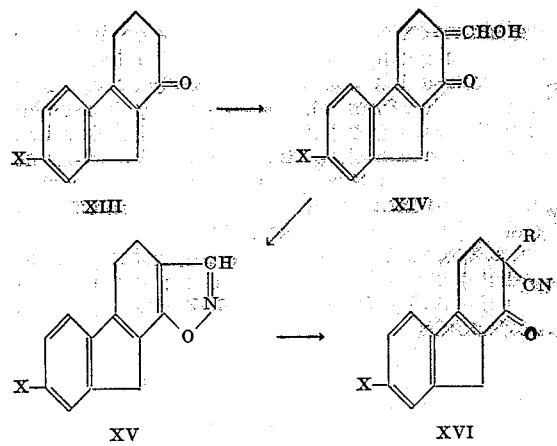

The following examples illustrate the invention, the parts being by weight unless otherwise stated, and the relationship of parts by weight to parts by volume being the same as that of the gram to the cubic centimetre:

*Example 1*

A solution of 10 parts of 7-methoxy-1-oxo-2-methyl-1:2:3:4-tetrahydrofluorene-2-carboxylic acid methyl ester of the formula

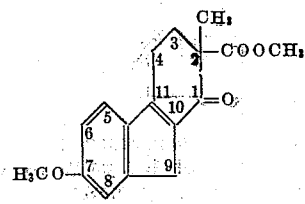

in 150 parts by volume of benzene is run at about 0° C. into a Grignard solution prepared from 1.27 parts of magnesium and 5.7 parts of ethyl bromide in 150 parts by volume of ether. The reaction mixture is then boiled on the water-bath and, after being cooled, is decomposed with ice and hydrochloric acid. After washing, drying and evaporating the solvent, the crude reaction product is obtained in the form of a brown coloured oil.

For the purpose of splitting off water, the product is then dissolved in 200 parts by volume of chloroform and, after the addition of 0.5 part of iodine, is boiled in a reflux apparatus for 1½ hours. The cooled solution is then poured into water, washed with sodium thiosulphate and water, dried and evaporated. The product resulting from the splitting off of water is obtained in the form of a brown coloured oil. After distillation under very reduced pressure (boiling point=170° C. under 0.05 mm.), there is obtained pure 7-methoxy-2-methyl-1-ethylidene-1:2:3:4-tetrahydrofluorene-2-carboxylic acid methyl ester of the formula.

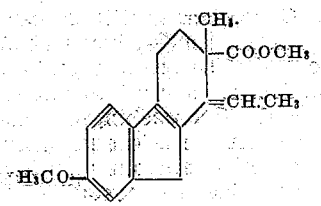

As an agent for splitting off water there is also suitable, for example, concentrated formic acid with the application of heat or phosphorus oxychloride in the presence of a suitable solvent such as benzene, toluene or acetic acid.

For the purpose of hydrolysing the carbomethoxy group, 8 parts of 7-methoxy-2-methyl-1-ethylidene-1:2:3:4-tetrahydrofluorene-2-carboxylic acid methyl ester are heated at 150–180° C. in a mixture of 25 parts of potassium hydroxide, 5 parts by volume of water and 10 parts by volume of alcohol. The reaction mixture is then poured into water, resinous neutral bodies are extracted therefrom by means of ether, and it is then acidified with a mineral acid, whereupon the unsaturated acid is precipitated in the form of a yellow coloured mass of crystals. After filtering with suction, the crystals are washed on the filter with water, dried and recrystallised from acetone. The 7-methoxy-2-methyl-1-ethylidene-1:2:3:4-tetrahydrofluorene-2-carboxylic acid so obtained has the formula

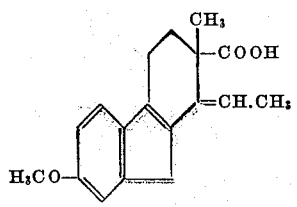

and melts at 176–178° C. with decomposition.

2 parts of this unsaturated acid are dissolved in 200 parts by volume of caustic soda solution of 1 per cent. strength, and hydrogenated in the presence of 2 parts of a nickel catalyst. The hydrogenation ceases after a quantity of hydrogen equivalent to 1 mol has been absorbed. After removing the catalyst, the alkaline solution is acidified to precipitate the hydrogenated acid in solid form. After recrystallisation from methanol the 7-methoxy-2-methyl-1-ethyl-1:2:3:4-tetrahydrofluorene-2-carboxylic acid of the formula

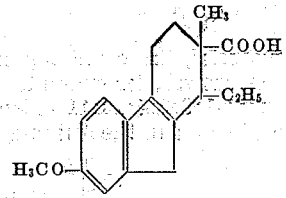

melts at 151–152° C.

After recrystallisation from methanol, the 7-methoxy-2-methyl-1-ethyl-1:2:3:4-tetrahydrofluorene-2-carboxylic acid methyl ester, prepared from the above acid by means of an ethereal solution of diazo-methane, melts at 56–57° C.

The esterification of the carboxyl group may also be carried out by first converting the acid into the acid chloride advantageously, for example, by means of oxalyl chloride, and reacting the acid chloride with the desired alcohol, or by reacting the carboxylic acid salt with an appropriate halide.

3 parts of 7-methoxy-2-methyl-1-ethyl-1:2:3: 4-tetrahydrofluorene-2-carboxylic acid melting at 151–152° C. are heated with 20 parts of pyridine hydrochloride for 3–4 hours at 170–180° C. in order to hydrolyse the methoxy group. The reaction product is poured into water, extracted with ether, and, after washing the extract solution with hydrochloric acid and water and drying it, the solvent is evaporated. The pale yellow coloured residue is recrystallised from ethyl acetate. The resulting 7-hydroxy-2-methyl-1-ethyl-1:2:3:4-tetrahydrofluorene - 2 - carboxylic acid melts at 174–176° C. and has the formula

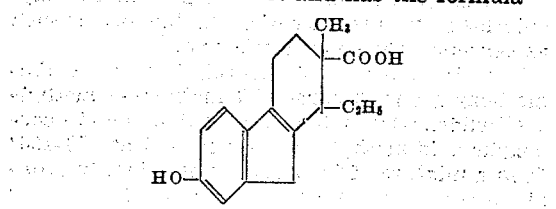

1 part of this hydroxy-acid is converted into the carbomethoxy-derivative by means of diazo-methane. The crude product is dissolved in caustic soda solution, somewhat more than the calculated quantity of benzoyl chloride is added, and the mixture is vigorously agitated. The benzoyl-derivative soon separates in the form of an oil. The resulting 7-benzoyloxy-2-methyl-1-ethyl-1:2:3:4-tetrahydrofluorene - 2 - carboxylic acid methyl ester boils at 180° C. under 0.05 mm. pressure and has the formula

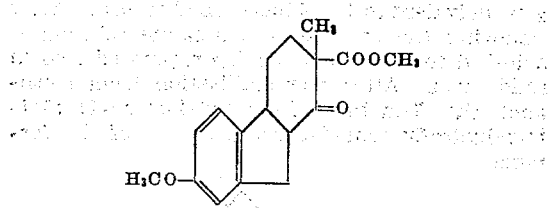

In an analogous manner there can be obtained, for example, the 7-propionate and the 7-butyrate.

By carrying out the synthesis with 7-methoxy-1-oxo-2-methyl-1:2:3:4:10:11 - hexahydrofluorene-2-carboxylic acid methyl ester of the formula

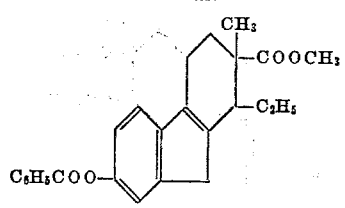

as starting material, the corresponding hexahydrofluorene derivatives, for example, 7-methoxy-2-methyl-1-ethyl-1:2:3:4:10:11 - hexahydrofluorene-2-carboxylic acid of the formula

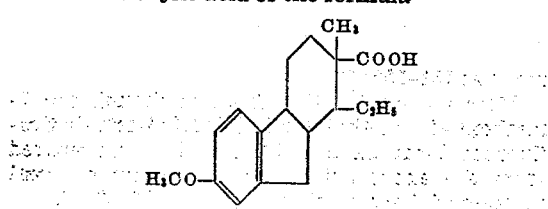

are obtained.

In an analogous manner the synthesis may start with 1-keto-hydrofluorenes containing in the 7-position a free hydroxyl group or an esterified hydroxyl group, such as a benzyloxy, acetoxy or propionyloxy group and in the 2-position a nitrile or acid amide group.

The 1-keto-hydrofluorenes used as starting materials, for example, the 7-methoxy-1-oxo-2-methyl-1:2:3:4-tetrahydrofluorene - 2 - carboxylic acid methyl ester may be prepared as follows:

41.4 parts of meta-methoxybenzyl-malonic acid diethyl ester of the formula

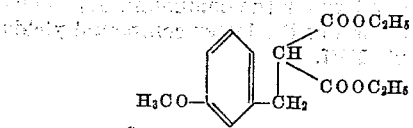

are converted in solution in benzene into the sodium compound by means of 3.45 parts of sodium. The sodium compound partially precipitates in crystalline form, and, after cooling, is reacted with 33 parts of glutaric acid ethyl ester chloride. In order to complete the reaction the whole is boiled for a further ½ hour, and then cooled and poured into water. The benzene solution is washed with a solution of sodium chloride, dried and evaporated. The reaction product is purified by distillation under very reduced pressure (boiling point=182–187° C. under 0.05 mm.), and has the formula

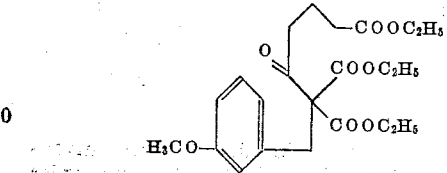

37 parts of the latter keto-triester are dissolved in 250 parts by volume of phosphoric acid of 100 per cent. strength, and the mixture is heated for 5 hours at 50–60° C. The red-brown, clear solution, after being cooled, is poured into ice-water and extracted with ether. The red product resulting from ring closure having the formula

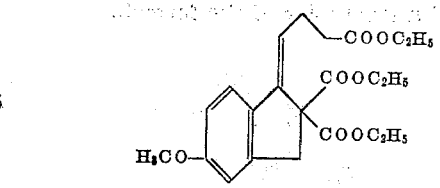

is hydrolysed, without further purification, by means of a mixture of 100 parts by volume of methanol and 100 parts by volume of an aqueous caustic potash solution of 45 per cent. strength on the water-bath. The tricarboxylic acid is isolated in the usual manner, and decarboxylated by heating it under reduced pressure at about 100° C. The dicarboxylic acid so obtained has the formula

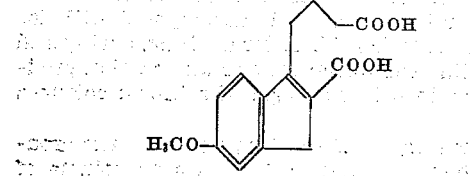

and melts at 233–235° C. (with decomposition) after recrystallisation from acetone.

32.6 parts of the latter acid are esterified by means of diazo-methane, and, in order to bring about the Dieckmann condensation, the resulting oily dimethyl ester is heated in 320 parts by volume of benzene with sodium methoxide obtained from 4.94 parts of sodium and methanol. After 24 hours the whole is cooled, a mixture of 110 parts by volume of methyl iodide and 110 parts by volume of methanol is added, the whole is allowed to stand for 12 hours, and finally boiled for a further hour in a reflux apparatus. The cooled mixture is then poured into the calculated quantity of ice-cold acetic acid, the solution is washed in turn with sodium carbonate solution and water, and evaporated to dryness. The residue is distilled under very reduced pressure. The resulting 7-methoxy-1-oxo-2-methyl-1:2:3:4-tetrahydrofluorene-2-carboxylic acid methyl ester of the formula

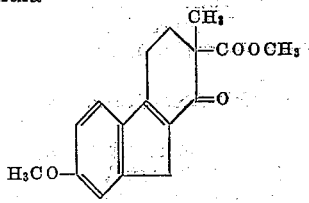

boils at 180° C. under 0.05 mm. pressure. After recrystallisation from methanol it melts at 95–97° C.

In a similar manner it is possible to introduce into the 2-position a hydrocarbon radical of higher molecular weight by using, instead of methyl iodide, for example, an alkyl halide such as ethyl iodide, propyl iodide, isopropyl iodide or butyl iodide.

7-methoxy-1-oxo-2-methyl-1:2:3:4:10:11-hexahydrofluorene-2-carboxylic acid methyl ester of the formula

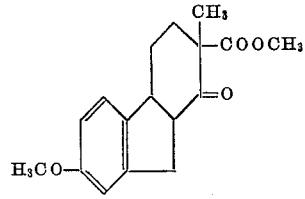

can be obtained by a process similar to that described above and by hydrogenating the ethylenic double bond in the course of the synthesis.

*Example 2*

5 parts of 7-methoxy-1-oxo-2-methyl-1:2:3:4-tetra-hydrofluorene-2-carboxylic acid methyl ester, dissolved in 75 parts by volume of benzene, are reacted at about 0° C. with a Grignard solution prepared from 0.65 part of magnesium, 3.75 parts of methyl iodide and 75 parts by volume of ether. After subsequent boiling on the waterbath, the reaction mixture is worked up in the manner described in Example 1. The resulting crude reaction product is then dissolved in 50 parts by volume of formic acid of 90 per cent. strength, and heated at about 90° C. When the splitting off of water has ceased, the whole is poured into water, then taken up in ether, the ethereal solution is washed with water and dried, and the solvent is evaporated. The residue is hydrolysed, without further purification, in the manner described in Example 1. From the acid product of hydrolysis, obtained in the form of an oil, there crystallises 7-methoxy-2-methyl-1-methylene-1:2:3:4 - tetrahydrofluorene - 2-carboxylic acid melting at 125–127° C. with decomposition and having the formula

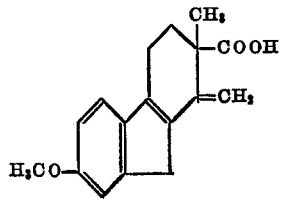

For the purpose of saturating the semi-cyclic double bond 2.5 parts of the foregoing unsaturated acid are dissolved in 500 parts by volume of caustic soda solution of 1 per cent. strength and hydrogenated in the presence of 5 parts of a nickel catalyst. The hydrogenation product, obtained in solid form by acidifying the alkaline solution, is recrystallised from methanol, and consists of 7-methoxy-1:2-dimethly-1:2:3:4-tetrahydrofluorene-2-carboxylic acid melting at 174–176° C. and having the formula

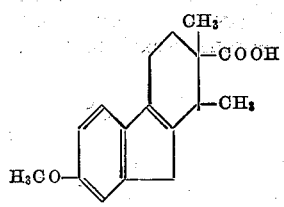

By splitting off the methoxy group in the manner described in Example 1 there is obtained from the latter product 7-hydroxy-1:2 - dimethyl-1:2:3:4-tetrahydrofluorene-2-carboxylic acid.

If, in the foregoing examples, a higher alkyl-magnesium halide is allowed to act on the 1-keto-hydrofluorenes, for example, on the 7-methoxy-1-oxo-2-methyl-1:2:3:4 - tetrahydrofluorene-2-carboxylic acid methyl ester, there is obtained as the final product a tetrahydrofluorene having in the 1-position a corresponding higher alkyl substituent. In order to produce hydrofluorenes having a substituent of higher molecular weight in the 2-position there is used as starting material a 1-keto-hydrofluorene having a substituent of higher molecular weight in the 2-position.

In a manner analogous to that described in the foregoing examples, there can be prepared the following compounds:

7-methoxy-1-ethyl - 2 - benzyl - 1:2:3:4 - tetrahydrofluorene-2-carboxylic acid;

7-ethyoxy-1:2-dipropyl - 1:2:3:4 - tetrahydrofluorene-2-carboxylic acid ethyl ester;

7-acetoxy - 1 - ethyl - 2 - methyl - 1:2:3:4:10:11-hexahydrofluorene-2-carboxylic methyl ester;

7-hydroxy - 1:2-diethyl - 1:2:3:4:10:11 - hexahydrofluorene-2-carboxylic acid;

7-methoxy-1-ethyl-2-methyl - 1:2:3:4 - tetrahydrofluorene-2-carboxylic acid amide.

What we claim is:

1. A hydrofluorene containing a lower alkyl radical in each of the 1- and 2-positions, a member selected from the group consisting of the carboxylic acid and carboxylic acid ester groups with lower alkanols in the 2-position, and a member selected from the group consisting of phenolic hydroxyl, lower alkoxy and lower acyloxy in 7-position.

2. The 7-methoxy-1-ethyl-2-methyl - 1:2:3:4-tetrahydrofluorene-2-carboxylic acid methyl ester of the formula

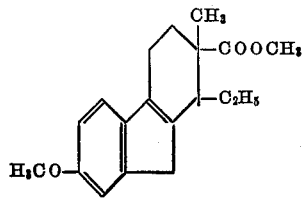

and melting at about 56–57° C.

3. The 7-methoxy-1-ethyl-2-methyl-1:2:3:4-tetrahydrofluorene-2-carboxylic acid of the formula

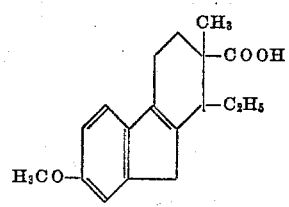

and melting point at about 151–152° C.

4. The 7-hydroxy-1-ethyl-2-methyl-1:2:3:4-tetrahydrofluorene-2-carboxylic acid of the formula

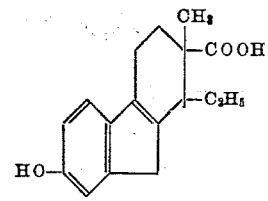

and melting point at about 174–176° C.

KARL MIESCHER.
GEORG ANNER.

REFERENCES CITED

The following references are of record in the file of this patent:

UNITED STATES PATENTS

| Number | Name | Date |
|---|---|---|
| 2,429,166 | Miescher et al. | Oct. 14, 1947 |

OTHER REFERENCES

Miescher: Helvetica Chim. Acta, vol. 22, pp. 1728, 1730, 1732, 1733 (1944).

Heer et al.: Helvetica Chim. Acta, vol. 28, pp. 1508, 1510 (1945).

Heer et al.: Helvetica Chim. Acta., vol. 28, page 992 (1945).

Anner et al.: Helvetica Chim. Acta, vol. 30, pp. 1422, 1423, 1424, 1425 (1947).

Anner et al.: Helvetica Chim. Acta, vol. 30, pp. 544, 545, 546, 547 (1947).

Heer et al.: Helvetica Chim. Acta, vol. 30, page 553 (1947).

Heer et al.: Helvetica Chim. Acta, vol. 30, pp. 778, 780, 786, 787 (1947).

Certificate of Correction

Patent No. 2,494,254

January 10, 1950

KARL MIESCHER ET AL.

It is hereby certified that errors appear in the printed specification of the above numbered patent requiring correction as follows:

Column 1, line 22, for the word "estrongenic" read *estrogenic*; line 35, for "hydronfluorene" read *hydrofluorene*; lines 41 and 42, for "organic-metallic" read *organometallic*; columns 3 and 4, for the Roman numeral "VII", second occurrence, designating the eighth formula, read *VIII*; column 5, line 2, after the word "following" insert *manner*; column 10, line 44, for that portion of the compound reading "7-ethyoxy-1" read *7-ethoxy-1*; column 11, lines 12 and 25, after "melting" strike out "point";

and that the said Letters Patent should be read with these corrections therein that the same may conform to the record of the case in the Patent Office.

Signed and sealed this 9th day of May, A. D. 1950.

[SEAL]

THOMAS F. MURPHY,
*Assistant Commissioner of Patents.*